(12) United States Patent
Kobayashi

(10) Patent No.: US 7,692,699 B2
(45) Date of Patent: Apr. 6, 2010

(54) IMAGE PICKUP APPARATUS FOR PREVENTING LINEARITY DEFECT

(75) Inventor: Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 640 days.

(21) Appl. No.: 11/545,538

(22) Filed: Oct. 11, 2006

(65) Prior Publication Data

US 2007/0085917 A1 Apr. 19, 2007

(30) Foreign Application Priority Data

Oct. 14, 2005 (JP) .............................. 2005-299892

(51) Int. Cl.
*H04N 9/64* (2006.01)
(52) U.S. Cl. ..................... 348/244; 348/241; 348/222.1
(58) Field of Classification Search ................. 348/244, 348/245, 248, 249, 257, 222.1, 241
See application file for complete search history.

(56) References Cited

U.S. PATENT DOCUMENTS

| | | | | |
|---|---|---|---|---|
| 4,412,246 A | * | 10/1983 | Allen et al. ................... 348/79 |
| 5,512,947 A | * | 4/1996 | Sawachi et al. ............. 348/243 |
| 5,841,488 A | * | 11/1998 | Rumreich .................... 348/694 |
| 6,304,292 B1 | * | 10/2001 | Ide et al. ..................... 348/243 |
| 2004/0252204 A1 | * | 12/2004 | Kurane .................... 348/222.1 |

FOREIGN PATENT DOCUMENTS

| JP | 2003-319267 A | | 11/2003 |
|---|---|---|---|
| JP | 2003319267 A | * | 11/2003 |

* cited by examiner

*Primary Examiner*—Tuan Ho
(74) *Attorney, Agent, or Firm*—Birch, Stewart, Kolasch & Birch, LLP

(57) ABSTRACT

In an image pickup apparatus for preventing linearity defect at the time of photographing in a high-sensitivity mode, when processing an image signal produced by a solid-state image pickup device under a predetermined condition, such as photographing in a super high-sensitivity mode, at a high temperature or with a long-time exposure, a signal processor increases a clamp level for clamping the image signal. A noise reducer then executes noise reduction for removing noise of random nature from the image signal before correcting the primary black level for the image signal, and thereafter the black level is corrected.

11 Claims, 5 Drawing Sheets

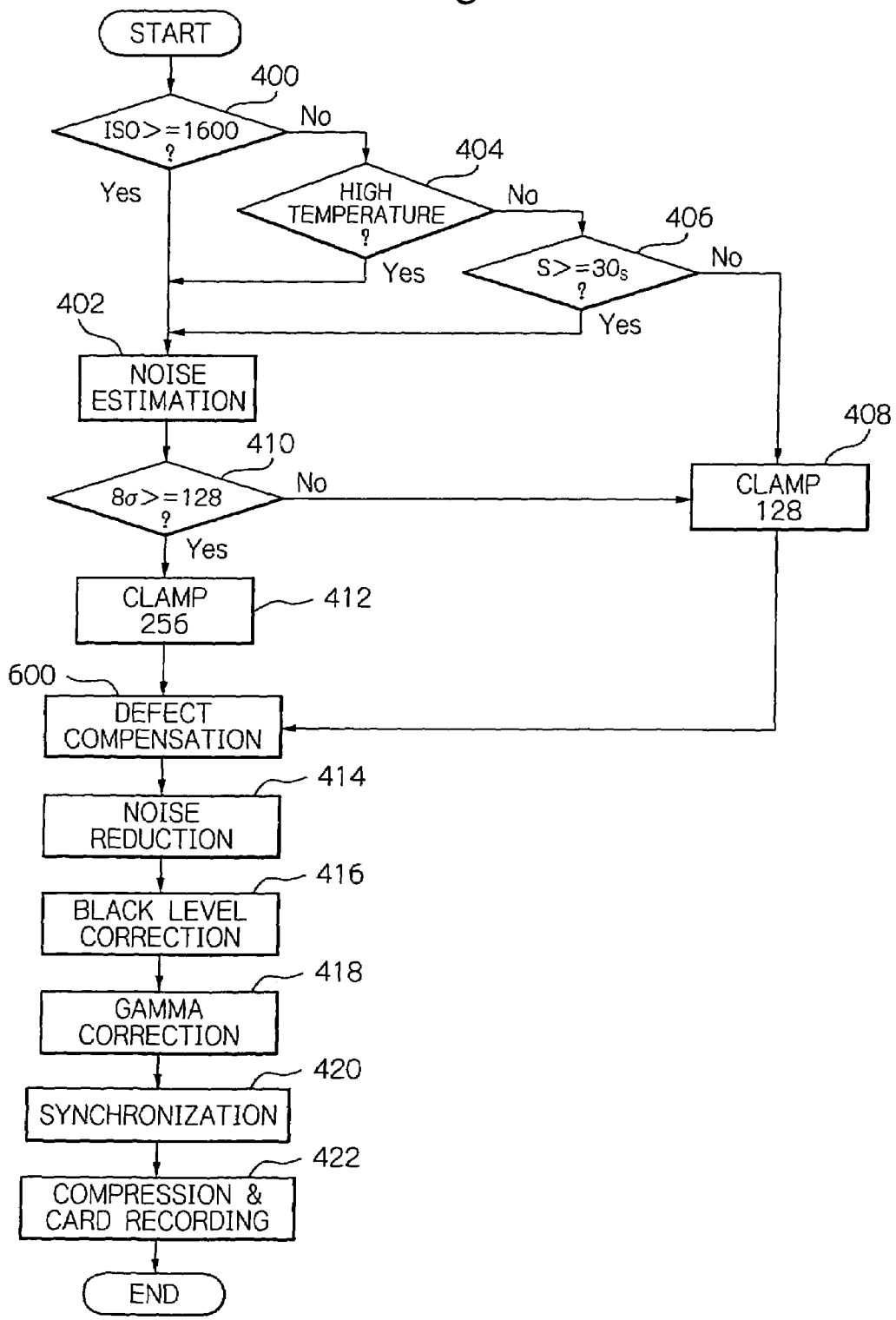

IMAGE PICKUP APPARATUS FOR PREVENTING LINEARITY DEFECT

BACKGROUND OF THE INVENTION

1. Field of the Invention

The present invention relates to an image pickup apparatus, and more particularly to an image pickup apparatus for photographing with, e.g. a higher photo-sensitivity.

2. Description of the Background Art

When photographing at a higher photo-sensitivity level, photographing over a longer exposure time, or photographing at a higher temperature, a solid-state image pickup device may produce from its effective photosensitive area an image signal lowered in level. This level lowering may be prevented by switching digital clamping to clamping with signal processing, as is disclosed for example in Japanese patent laid-open publication No. 2003-319267.

In recent years, micropixelation of solid-state image pickup devices, such as a CCD (Charge-Coupled Device) image sensor, has reduced the number of generated electric charges to lower a signal level used. Notwithstanding, cameras replete with a high-sensitivity mode capable of photographing wit less camera shake are called for in the market.

However, in view of achieving a camera replete with a high-sensitivity mode, a significant increase in gain is required in the subsequent stage to the output port of an image pickup device, and thus, a small distortion of the black level causes a visible image to significantly deteriorate, which has been a problem. In the idea disclosed in the above-indicated publication, clamping focuses attention on its noise, but not on noise in the level lowered in the effective area, and it is therefore considered that the advantage is in practice restrictive.

A real problem in clamping signals having much noise, such as those in a high-sensitivity mode, i.e. high ISO (International Organization for Standardization) mode, involves the following case: In a super high ISO mode, such as ISO3200 or ISO6400, a noise quantity to be estimated cannot be disregarded for signals. In such a case, if the processing sequence of the clamp level process, black level correction, i.e. offset correction, and noise reduction should not be adequately controlled, then the signals after reduced in noise cause linearity defects, which leads to, for example, a turned hue or distortion in hue. The present invention relates to an image pickup apparatus for preventing linearity defect in a noise clipping process for processing an output of an image pickup device at the time of, e.g. high-sensitive photographing.

SUMMARY OF THE INVENTION

It is an object of the present invention to provide an image pickup apparatus for deducing a linearity defect which would be caused by noise clipping notably in a high-sensitivity photographing mode.

An image pickup apparatus for picking up an image of a field to produce an image signal in accordance with the present invention includes an image pickup device for picking up an imaging field to produce an image signal representative of the imaging field, and a signal processor for processing the image signal. When processing the image signal produced under a predetermined exposure condition, the signal processor increases a clamp level for clamping the image signal, performs noise reduction for removing noise of random nature from the image signal before correcting the primary black level for the image signal, and then carries out the black level correction.

According to the present invention, when an image signal output from an image pickup device is processed with a signal processor even in the case of a high-sensitivity photographing mode, photographing at a high temperature or photographing with a long-time exposure, black level correction is carried out after each of the processing, thereby making it possible to prevent noise clipping in both analogue and digital systems of the apparatus as well as to prevent a linearity defect. Also, even in a case where there are a number of fixed pattern defects, noise clip can be prevented. Further, in the case of obtaining cumulative data, noise clipping in an integrator system can be prevented.

BRIEF DESCRIPTION OF THE DRAWINGS

The objects and features of the present invention will become more apparent from consideration of the following detailed description taken in conjunction with the accompanying drawings in which:

FIG. 6 is a flow chart useful for understanding the operation of the image pickup apparatus in the alternative embodiment shown in FIG. 5.

DESCRIPTION OF THE PREFERRED EMBODIMENTS

Figure 1:
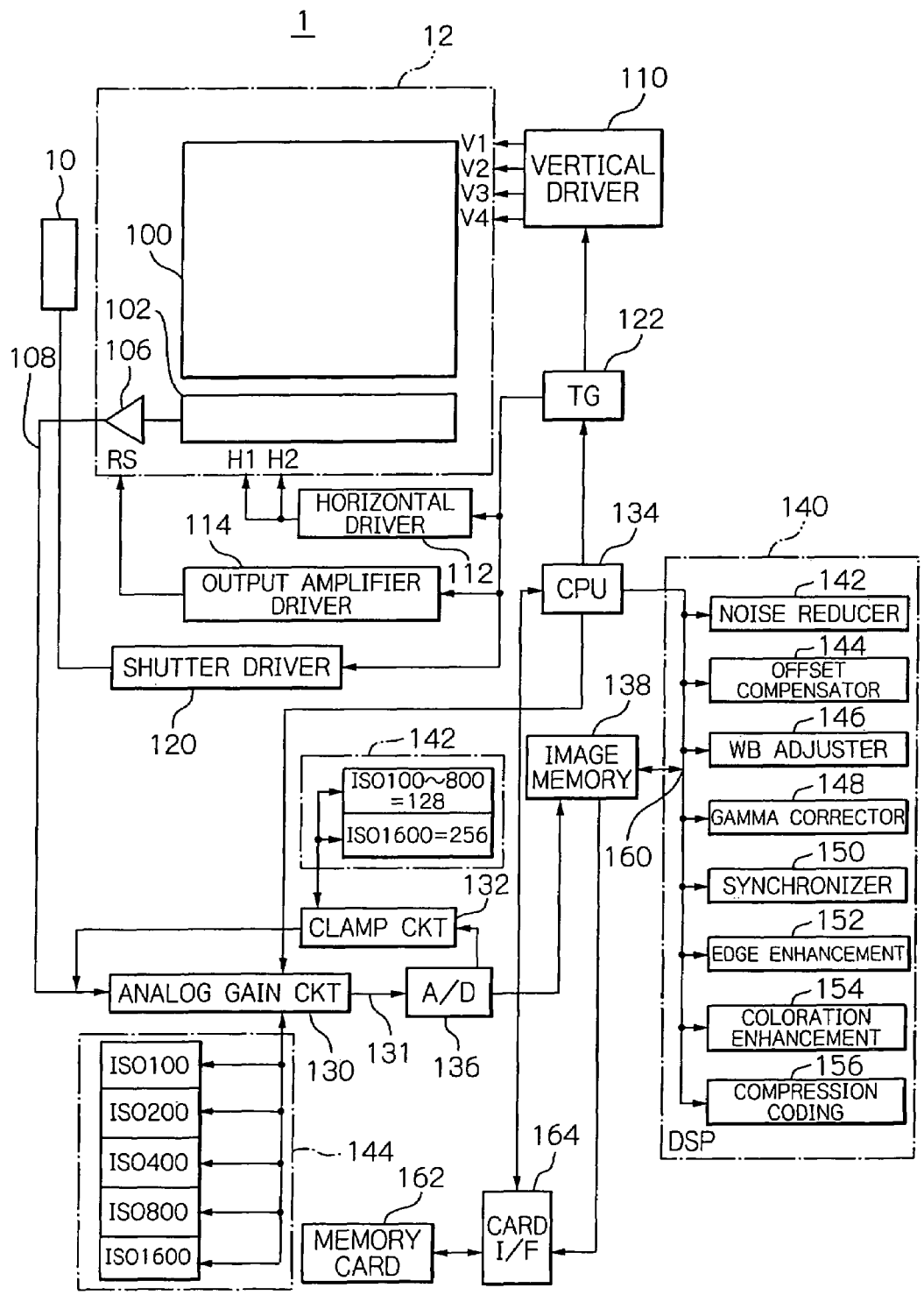
FIG. 1 is a schematic block diagram showing an embodiment of an image pickup apparatus to which the present invention is applied.

In the following, preferred embodiments of an image pickup apparatus in accordance with the present invention will be described in detail with reference to the appended drawings. Referring to FIG. 1, an illustrative embodiment 1 of an image pickup apparatus in accordance with the present invention includes a solid-state image pickup device 12 adapted for receiving an optical image incident thereto through an imaging lens, not shown, and a mechanical shutter 10 to perform photoelectrical conversion.

The solid-state image pickup device 12 is a camera image sensor, which is placed on the focal plane of the imaging lens and converts an optical image formed on the focal plane to electric signal charges corresponding thereto. The solid-state image pickup device 12 in the embodiment reads out to a vertical transfer path the signal charges generated in a bi-dimensional array of photosensitive cells 100 arranged in the horizontal and vertical scanning directions of the imaging area, and vertically transfers them in response to vertical transfer pulses V1-V4 fed from a vertical driver 110 toward a horizontal transfer path 102. The horizontal transfer path 102 is driven by the horizontal transfer pulses H1 and H2 fed from a horizontal driver 112 and horizontally transfers the signal charges from the vertical transfer path toward an output amplifier 106.

The output amplifier 106 sequentially detects the signal charges in response to the reset pulses fed from the output amplifier driver 114 and outputs pixel signals corresponding to the detected signal charges to its output 101, which constitutes an output of the solid-state image pickup device 12. In this way, pixel signals corresponding to an optical image captured by the solid-state image pickup device 12 are generated. In addition, the mechanical shutter 10 exposing the solid-state image pickup device 12 with incident light is controlled for its releasing period of time, or exposure time, by a drive signal fed from a shutter driver 120.

The vertical driver 110, horizontal transfer path 102, output amplifier driver 114 and shutter driver 120 are responsive to respective timing signals fed from a timing generator (TG) 122 to produce drive signals.

The output amplifier 106 has its output 108 connected to an analog gain circuit 130 via a correlated double sampling (CDS) circuit not shown in the figure. The analog gain circuit 130 is a variable-gain amplifier for variably amplifying the output of the solid-state image pickup device 12 with its gain variable, and has its input 108 also connected to receive an output of a clamp circuit 132 in a feeding back manner so that a pixel signal clamped at a predetermined level is inputted therein. The gain of the analog gain circuit 130 is controlled with a control output of a control circuit 134, which is implemented by a central processor unit (CPU).

The analog gain circuit 130 has its output 131 connected to an analog-to-digital converter (A/D) 136, which converts the pixel signal to a corresponding digital signal, which will once be stored in an image memory 138 and thereafter fed to a digital signal processor (DSP) 140. Further, the analog-to-digital converter 136 outputs a feedback signal to the clamp circuit 132, while the clamp circuit 132 generates a feedback signal according to a value set by a setting register 142, where a value set according to the ISO (International Organization for Standardization) sensitivity is stored, and delivers it to the input of the analog gain circuit 130. A value to be set by the setting register 142 is, for example a value 128 in the case of the photo-sensitivity being set to ISO100-ISO800 and a value 256 in the case of the sensitivity being set to ISO1600 in the illustrative embodiment as shown in the figure.

Gain control in the analog gain circuit 130 is set according to a value stored in another setting register 144. The other setting register 144 in the illustrative embodiment has stored setting information for setting ISO100, ISO200, ISO400, ISO800 and ISO1600, as shown in the figure and set them in the analog gain circuit 130 according to instructions fed from the control circuit 134. In addition, the plurality of sensitivity values set are merely illustrative, and an arrangement may be made for setting other values of sensitivity, such as ISO64, ISO3200, etc.

The digital signal processor (DSP) 140 connected to the image memory 138 comprises a noise reducer 142 for removing noise from signals, an offset compensator 144 for compensating for an offset of signals, a white balance (WB) adjuster 146 for adjusting white balance, a gamma corrector 148 for performing gamma correction, a synchronizer 150 for performing synchronization on image signals, a contour enhancement part 152 for enhancing a contour or edge, a coloration enhancement part 154 for adjusting saturation of color, and a compressor 156 for compression-coding image data, which are interconnected via a common bus 160 to the control circuit 134 and the image memory 138. Also, connected to the image memory 138 there is a card interface (I/F) 164 for interfacing a memory card 162.

The control circuit 134 is adapted for controlling the image pickup apparatus 1 according to operational information inputted into its operational panel, not shown in the figure. The control circuit 134 controls, for example, the start-up of the exposure value calculation and the focal adjustment control necessary for photographing, and further defines the starting of a shutter release to the constituent elements, such as the timing generator 122, to control the period of an exposure time. Also, the control circuit 134 has a function to set the ISO sensitivity according to the operational information fed by the operational panel.

Now, reference will be made to FIG. 2, which plots a relation between the quantity of the light incident to the solid-state image pickup device 12 and the quantity of digital signals in the case of being set to a lower ISO sensitivity level. As shown in the figure, the horizontal axis represents the quantities of incident light normalized at respective ISO sensitivity levels, and the vertical axis represents signal levels and noise quantities ($\sigma$) after corrected in black level and adjusted in white balance without reducing noise. Also, FIG. 3 plots a relation between the quantity of light incident to the solid-state image pickup device 12 and the quantity of digital signals in the case of being set to a higher ISO sensitivity level.

In the following, description will be made on the reason why in FIG. 3 the lower brightness side tends to be magenta while the higher brightness side tends to be green will be described.

Noise of a solid-state image pickup device can be modeled in general by the following expression (1):

$$\text{Total\_Noise} = \text{SQRT}(a^* \text{ Sig} + (a^* \text{ Noise})^2), \qquad (1)$$

where, $\underline{a}$ represents gain, a=ISO sensitivity gain * WB gain=iso * wb, while Sig is a signal level of a digital image (after adjusted in white balance) and the Noise represents dark noise.

As described above, the total noise increases dependently on the signal level Sig and gain $\underline{a}$=iso * wb. The graph shown in FIG. 3 represents a state after adjusted in white balance, and thus, in each plot Sig is not dependent upon color, while A=iso * wb is dependent upon color. For this, in spite that the color channels for each relative exposure plot on the same, the error bars representative of noise at a noise level in question are different in length from color to color.

For example, the total noise in terms of brightness being Sig=1000 will be, on the assumption of Noise=10:

$$\text{Total\_Noise }(R) = \text{SQRT}(100a(R^2 + 1000a(R)), \qquad (2)$$

$$\text{Total\_Noise }(G) = \text{SQRT}(100a(R^2 + 1000a(G)), \qquad (3)$$

$$\text{Total\_Noise }(B) = \text{SQRT}(100a(R^2 + 1000a(B)), \qquad (4)$$

where R, G and B represent red, green and blue, respectively.

When the white balance is adjusted in the sunlight, usually $\underline{a}$(G) is larger than $\underline{a}$(R) and $\underline{a}$(B). To be exact, it varies depending on the spectral properties of the imaging lens, IR (Infrared Ray) cut filter, CCD color filter, photodiodes embedded in the CCD, etc., while for example, $\underline{a}$(G) is imparted at a ratio of 1.2* iso, whereas $\underline{a}$(R) is imparted at a ratio of 1.8* iso and $\underline{a}$(B) at a ratio of 2.0* iso, the following expressions are developed:

$$\text{Total\_Noise }(G) < \text{Total\_Noise }(R), \qquad (5)$$

$$\text{Total\_Noise }(G) < \text{Total\_Noise }(B). \qquad (6)$$

While the ISO gain iso is smaller, noise clipping due to an increase in the total noise and difference in color between the total noises are small enough to be ignorable, which is not problematic, whereas when the ISO gain iso becomes larger, then firstly, clipping takes place to zero by the pixels containing noise generated on the negative side with respect to the real Sig in the lower brightness so as to increase the primary black level, or clipping takes place to 4096 (in the case of a 12-bit system) by the pixels containing noise generated on the positive side with respect to the real Sig in the higher brightness so as to lower the primary white level.

Secondly, since the above tendencies relatively significantly occurs in R and B channels larger in noise than a G channel, the black levels of the R and B channels rise higher than the G channel in the lower brightness so as to be R, B>G, resulting in change to magenta (Mg), or the white level of the G channel goes lower than those of the G and B channels in the higher brightness so as to be R, B<G, resulting in change to green (G).

As for the above negative effects, signal difference is suppressed by the gamma characteristic in the vicinity of the white level, while it is enhanced by the gamma characteristic in the vicinity of the black level, and therefore, the latter negative effect is significant in general. Further, when the white balancing position has changed, the above-described negative effect in the second case varies. For example, when a (R) is small and a (G) and a (B) are larger at a lower color temperature, the above-described negative effect in the second case varies in such a way that the black levels in the G and B channels rise higher than that in the R channel in the lower brightness so as to be G, B>R, resulting in change to red (R). In other words, the negative effect in the second case described above may be generalized in a way that coloration of channels having much noise occurs in the vicinity of the black level and coloration of channels having less noise occurs in the vicinity of the white level.

Figure 2:
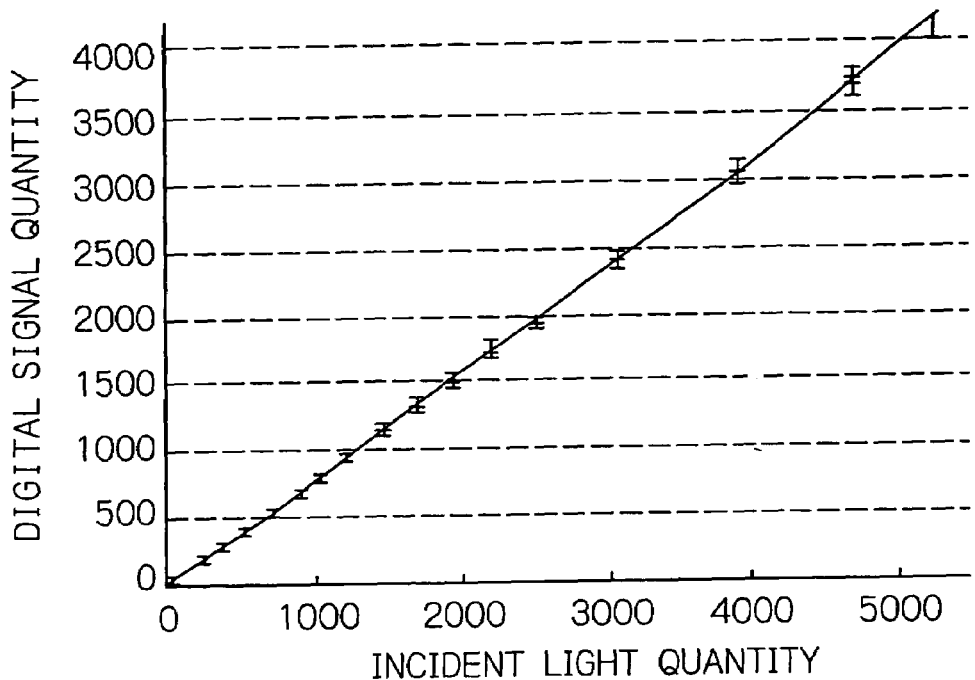
FIGS. 2 and 3 plot a relation between the quantity of light incident to the solid-state image pickup device of the illustrative embodiment shown in FIG. 1 and the quantity of digital signals when set at its lower and higher ISO sensitivity levels, respectively.
Figure 3:
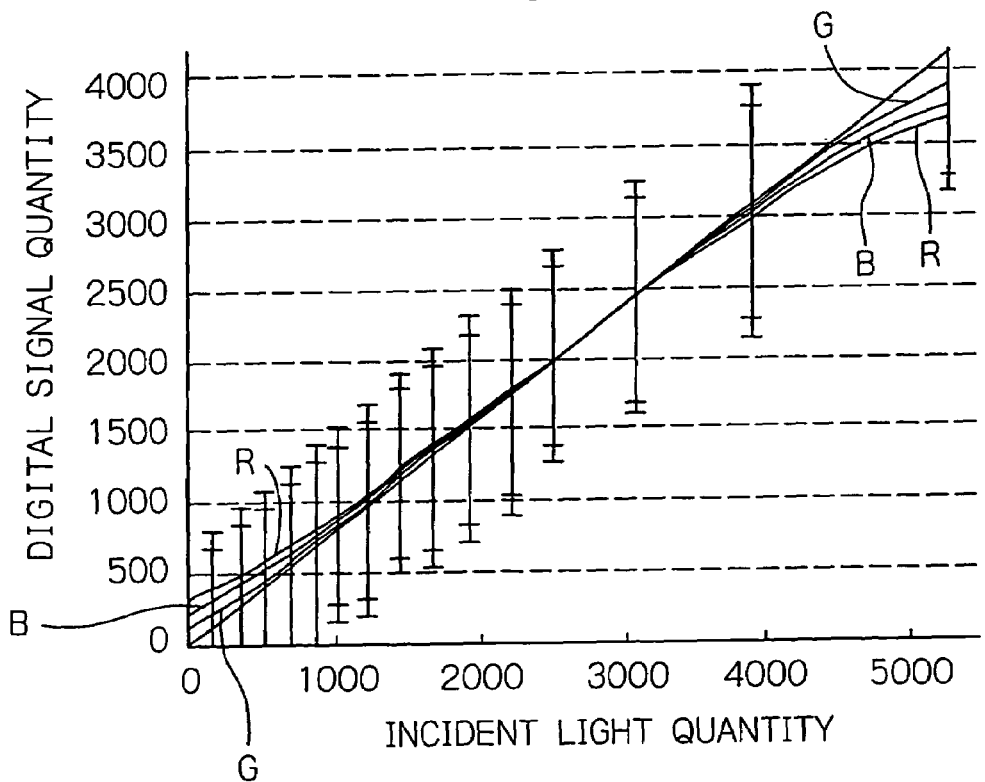

FIGS. 2 and 3 show examples calculated by modeling the generation of noise of random nature. As shown in FIG. 3, in the lower brightness the noise pixels lower than the mean value are clipped to zero. Consequently, even when noise reduction, such as smoothing, takes place thereafter, it appears that a color signal having much noise stands out. More specifically, characteristic degradation occurs, in which the color turns to a color with gain increased depending upon the white balance position, while the color turns to a color opponent thereto in the case of being clipped to a higher level of brightness.

Figure 4:
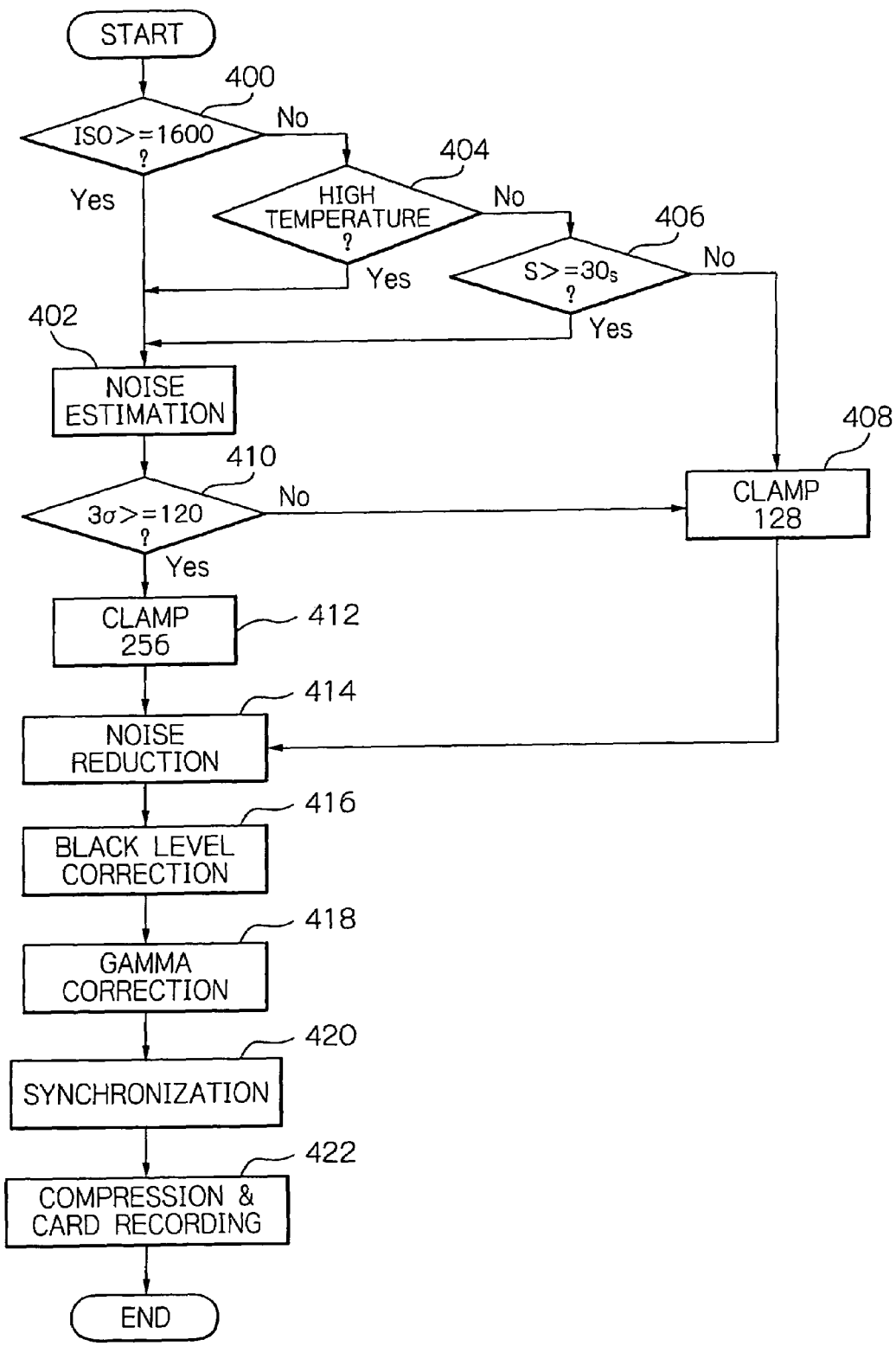
FIG. 4 is a flowchart useful for understanding the operation of the image pickup apparatus of the illustrative embodiment.

The operation of an image pickup apparatus 1 causing such a situation will be described with reference to FIG. 4. To begin with, photographing is started in response to depressing a shutter release button provided in the operational panel not shown. The exposure of an imaging field is started and the mechanical shutter, not shown, is closed after exposure for a predetermined period of time. After sweeping out smears in order to reset the vertical transfer path (VCCD) of the solid-state image pickup device 12, the shift gate not shown is opened to read out or develop signal charges representative of captured images to the vertical transfer path. Over each of the vertical transfer paths, the signal charges for the pixels associated therewith are transferred in four phases, while two-phase transfer takes place over the horizontal transfer path (HCCD). Finally, the signal charges are transferred to the floating diffusion amplifier (FDA), not shown, of the output amplifier 106. In the output amplifier 106, resetting operation takes place for every pixel so as to avoid color mixture with adjacent signals. In addition, photographing in the illustrative embodiment includes a case of photographing to obtain, for example, darkest image data, i.e. light-shielded data, which may preferably be processed, for example in signal processing and used in signal processing and the like.

In the analog-to-digital converter 136, optical black (OB) clamping takes place for every horizontal scanning line to bring the black level in a given value with an offset (for example, the median value "128" in the 12-bit system, or others). In the analog gain circuit 130, the gain in accordance with ISO sensitivity setting is adjusted to amplify a signal to then deliver it to the analog-to-digital converter, where analog-to-digital conversion is performed. The converted image data are written in the image memory 138.

In the illustrative embodiment, the clamp level is increased from a value, for example, 128 to 256, depending upon the set ISO sensitivity, a higher temperature and an exposure for a longer period of time to thereby prevent ones of the noise pixels of a brightness lower than the mean value from being clipped. Specifically, in step 400 shown in FIG. 4, it is determined whether or not the ISO sensitivity is higher than a predetermined value, ISO1600 with the illustrative embodiment, and if the sensitivity has been set to ISO1600 or more, then the procedure proceeds to step 402, and otherwise to step 404.

In step 404, it is further determined whether or not the temperature is higher than a predetermined value. If the temperature is higher than the predetermined value, then the procedure proceeds to step 402, and otherwise to step 406. In step 406, it is determined whether or not the shutter speed, i.e. the shutter release period of time of the mechanical shutter is of a long-time exposure, for example, for 30 second or more. When it is 30 second or more, the procedure proceeds to step 402, and otherwise it proceeds to step 408. In step 408, a clamp level in the clamp circuit 132 is set to a value "128".

On the other hand, in step 402 followed by steps 400-406, an estimation of the noise quantity ($\sigma$) takes place according to the results of determining conditions in steps 400-406. Subsequently, when proceeding to step 410, it is determined whether or not a clamp quantity about three times as much as the noise quantity ($\sigma$) estimated in step 402 is secured. When it can be secured, the procedure proceeds to step 412 where the clamp level is set to a value "256". After that, the procedure proceeds to step 414. In such a case, when noise distribution follows a normal distribution and if the clamp level of about three times as much as the estimated noise quantity is to be secured, a pixel to be clipped is of 0.3/2 percent, from which a favorable effect can be expected in addition to that from noise reduction which will be described later. When the clamp level of about three times as much as the noise quantity ($\sigma$) has not been secured in step 410, the procedure proceeds to step 408, where the clamp level is set to the value "128". Then, the procedure proceeds to step 414.

In step 414, noise reduction is executed. In such a case, noise reduction is taken place by the noise reducer 142 while the black level is maintained. Noise reduction removes noise of random nature, such as of smoothened, median type and the like. In this process, pixel clipping due to inevitable random noise, such as amplifier noise, optical shot noise, etc., is prevented. After that, before white balance is adjusted, black level or offset compensation is executed in step 416, gamma correction is executed in step 418, and synchronization is executed in step 420. After those processes, white balance adjustment takes place.

The image data thus processed are compress-coded by the compressor 156 and recorded in, for example, the memory card 162 connected to the card interface 164.

As described above, the configuration, in which a clamp level is controlled to be increased at the time of photographing under a predetermined exposure condition, such as a super high-sensitivity mode, a high temperature, long-time exposure, etc., then noise reduction for removing random noise takes place prior to black level adjustment and thereafter the black level is adjusted. It is therefore possible to prevent noise clipping in the analog and digital systems of the image pickup apparatus. In such a case, even when the clamp level is not increased, an advantageous effect can be obtained in respect of prevention of noise clipping in the digital system.

Figure 5:
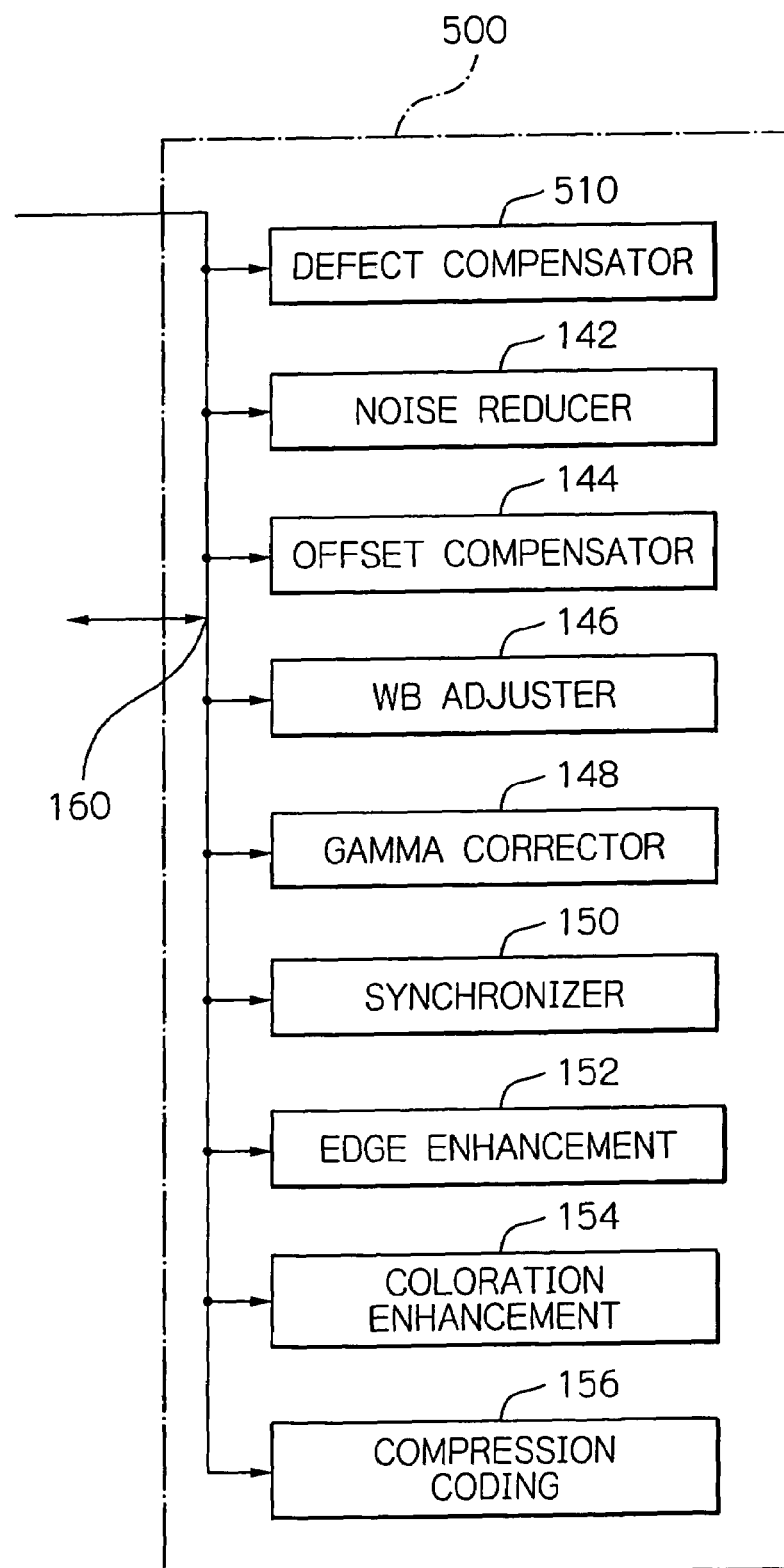
FIG. 5 is a schematic block diagram showing an alternative embodiment of a signal processor.

In the following, an alternative embodiment of the image pickup apparatus will be described with reference to FIG. 5. The image pickup apparatus in accordance with the alternative embodiment may be the same as the image pickup apparatus 1 shown in FIG. 1 except that the former includes a signal processor for compensating for a defect in an image prior to reducing noise in step 414, FIG. 4, while the remaining configuration may be the same as the image pickup apparatus 1. The signal processor 500 in the alternative embodiment is shown in FIG. 5. The signal processor 500 may be identical with the signal processor 140 except that it includes a defect compensator 510 in addition to the configuration of the signal processor 140 in the image pickup apparatus 1 shown in FIG. 1, while the remaining structure may be similar to that of the signal processor 140 shown in FIG. 1, description of which will thus not be repeated.

The defect compensator 510 in the alternative embodiment is adapted to correct image data in terms of removal of high-frequency fixed pattern noise involved in the black level such as compensation of an image defect such as a spot- or scratch-like defect, compensation of a vertical line defect and correction of an inter-field step (a horizontal line defect). In the alternative embodiment, for removal of high-frequency fixed pattern noise, only an offset from the primary black level may preferably be corrected.

Subsequently, in FIG. 6 there is shown an operational flow of the image pickup apparatus in the alternative embodiment. What is different from the operation described in FIG. 4 is that noise reduction takes place followed by step 412 and thereafter, black level correction takes place in the following step 414. The processing operations similar to those shown in FIG. 4 are denoted with the same reference numerals, description of which will thus not be repetitive.

In step 600, the digital signal processor 140 first removes frequency noise accompanied with the black level, such as compensation of a defect, compensation of a vertical line defect, correction of an inter-field step (horizontal line defect), etc. As a control often performed with a long-time exposure, light-shielded data, which are obtained with light shielded, are possibly subtracted, in which case subtraction is executed only for a differential form, i.e. on a difference from the primary or basic black level, for example, with the primary black level (e.g. "128" or "256") maintained as well.

More specifically, assuming that the light-shielded data is represented by Dark (x, y), the primary black level is equal to "128" and the exposure data are represented by Data (x, y), then Data (x, y) after defect compensation is obtained by the following expression (7):

Data (x, y) after defect compensation=Data (x, y)−(Dark (x, y)−128). (7)

After having removed in particular high-frequency noise from the fixed pattern noise encountered in such a dark noise circumstance, noise reduction intended for removal of noise of random nature is executed in a similar manner to that in the illustrative embodiment shown in FIG. 1, and thereafter, the primary black is corrected. Image defects, as being generally called as "white defect", tend to rise in gradation. Therefore, when they are smoothened rather than removed, the black falls to a further extend like in noise clipping. On the other hand, it is not problematic to remove low-frequency noise, such as one in shading in dark, after the primary black level correction.

Well, another alternative embodiment of the image pickup apparatus to which the present invention is applied will be described. Usually, a digital camera is provided with an automatic white balance adjustment (AWB) function as an automatic signal processing system, which acquires divided and cumulative data from a captured image, from which a light source of the image field captured is estimated to find out an optimum white balance gain. Such an automatic signal processing system for obtaining divided and cumulative data is also required, for example, in automatic focusing (AF) adjustment.

Thus, the signal processors 140 and 500 in the image pickup apparatus shown in FIGS. 1 and 5, respectively, are provided with a white balance adjustor 146. In the instant alternative embodiment, in order to obtain divided and cumulative data, integration is performed with the black level maintained in a manner described in connection with the above illustrative embodiments, and then the primary black level is subtracted from the image data.

Specifically, $$R[i, j]=\Sigma data\_R(x, y)-128, \quad (8)$$

$$G[i, j]=\Sigma data\_G(x, y)-128, \quad (9)$$

$$B[i, j]=\Sigma data\_B(x, y)-128, \quad (10)$$

$$R/G[i, j]=R[i, j]/G[i, j], \quad (11)$$

$$B/G[i, j]=B[i, j]/G[i, j]. \quad (12)$$

For example, on the consumption of 0<i and j<8, integration with 64-division is performed by the white balance corrector 146. If integration data with area divided used in automatic white balancing and the like are acquired after the correction of the black level before noise reduction, an optimum white balance coefficient cannot be obtained, since this results in obtaining a white balance coefficient based on the raised black level. On the other hand, to acquire integration data, integration is performed for pixels in the same area color by color. As a result, a noise reduction effect similar to that in the averaging procedure can be obtained. Accordingly, in the instant alternative embodiment, by obtaining integration data while not correcting the black level but by thereafter correcting the black level based on the obtained integration data, it is possible to obtain an optimum white balance coefficient. Also, based on the same principle, integration data during a photometric operation can be obtained, so that a rise in black level can be prevented from occurring, and therefore, exposure control, which would otherwise decrease exposure, is not needed.

The entire disclosure of Japanese patent application No. 2005-299892 filed on Oct. 14, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. An image pickup apparatus for picking up an imaging field to produce an image signal, said apparatus comprising:
    an image pickup device for picking up an imaging field to produce an image signal representative of an image of the imaging field; and
    a signal processor for processing the image signal;

said signal processor increasing, when processing the image signal produced under a predetermined exposure condition, a clamp level for clamping the image signal, performing noise reduction for removing noise of random nature from the image signal prior to correcting a primary black level for the image signal, and then correcting the primary black level.

2. The image pickup apparatus in accordance with claim 1, wherein the predetermined exposure condition is a super high-sensitivity mode of photographing.

3. The image pickup apparatus in accordance with claim 1, wherein the predetermined exposure condition is a temperature higher than a predetermined temperature.

4. The image pickup apparatus in accordance with claim 1, wherein the predetermined exposure condition is long-time exposure of photographing.

5. The image pickup apparatus in accordance with claim 1, wherein said signal processor removes high-frequency pattern noise involved in the primary black level, then performs the noise level reduction, and thereafter corrects the primary black level.

6. The image pickup apparatus in accordance with claim 1, wherein said signal processor performs the noise reduction before correcting the primary black level using light-shielded data.

7. The image pickup apparatus in accordance with claim 5, wherein the high-frequency fixed pattern noise is any one of a spot defect, a vertical line defect and an inter-field step or horizontal defect.

8. The image pickup apparatus in accordance with claim 5, wherein the high-frequency fixed pattern noise includes all of a spot defect, a vertical line defect and an inter-field step or horizontal defect.

9. The image pickup apparatus in accordance with claim 5, wherein the high-frequency fixed pattern noise is removed by compensating for only an offset from data of the primary black level.

10. The image pickup apparatus in accordance with claim 1, wherein, when acquiring cumulative data for executing automatic signal processing based on the image, integration is executed instead of correcting the primary black level, followed by correcting the primary black level.

11. An image pickup apparatus for picking up an imaging field to produce an image signal, said apparatus comprising:
an image pickup device for picking up an imaging field to produce an image signal representative of an image of the imaging field; and
a signal processor for processing the image signal,
said signal processor executing, when an image is picked up under a predetermined exposure condition, noise reduction for removing noise of random nature at least prior to correcting a primary black level, thereafter correcting the primary black level, and removing high-frequency pattern noise involved in the primary black level, then executing the noise level reduction, and thereafter correcting the primary black level,
the high-frequency fixed pattern noise being removed by compensating for only an offset from data of the primary black level.

* * * * *